United States Patent [19]

Yokoya et al.

[11] Patent Number: 4,648,621

[45] Date of Patent: Mar. 10, 1987

[54] METHOD OF ADJUSTING VEHICLE HEIGHT

[75] Inventors: Yuji Yokoya; Shuuichi Buma; Hitoshi Araki; Hiroshi Miyata, all of Toyota; Masanori Hirose; Kaoru Ohashi, both of Okazaki, all of Japan

[73] Assignee: Toyota Jidosha Kabushiki Kaisha, Toyota, Japan

[21] Appl. No.: 729,555

[22] Filed: May 1, 1985

[30] Foreign Application Priority Data

Aug. 25, 1984 [JP] Japan .................................. 59-177058

[51] Int. Cl.4 ............................................. B60G 11/26
[52] U.S. Cl. ................................. 280/707; 267/64.17; 280/6 R
[58] Field of Search ............... 280/707, 6 R, 6 H, 6.1; 267/64.17, 64.18

[56] References Cited

U.S. PATENT DOCUMENTS 4,463,969  8/1984  Harrison ............................. 280/707
4,469,315  9/1984  Nicholls ............................ 280/707

Primary Examiner—Richard A. Bertsch
Attorney, Agent, or Firm—Oblon, Fisher, Spivak, McClelland & Maier

[57] ABSTRACT

A method of adjusting the height of a vehicle provided with an air suspension system capable of adjusting the vehicle height and having two air chambers capable of being communicated with and shut off from each other. The method comprises the steps of shutting off temporarily one air chamber from the remaining one and supplying the compressed air to the other air chamber when the vehicle height is to be increased. The supply of the compressed air is carried out at the same time as or prior to the shutting-off.

5 Claims, 7 Drawing Figures

METHOD OF ADJUSTING VEHICLE HEIGHT

BACKGROUND OF THE INVENTION

1. Field of the Invention

This invention relates to a method of adjusting a vehicle height and, more particularly, to a method of adjusting the height of a vehicle provided with a gas suspension system having a variable spring constant mechanism comprises from a plurality of gas chambers and a vehicle height adjusting function.

2. Description of the Prior Art

In a vehicle, for example, mounting an air suspension having a shock absorber disposed between a suspension arm and a vehicle body and the upper portion of which is surrounded by a housing and a diaphragm to form an air chamber for filling compressed air, the height of the vehicle can be adjusted or controlled by varying pressure in the air chamber.

In the vehicle provided with the air suspension, the relationship between time taken for adjusting or controlling the vehicle height and change in the vehicle height is as shown by a characteristic curve A in FIG. 1. Namely, when time T elapses from the beginning 0 of the vehicle height adjustment or the supply of the compressed air to the air chamber, a desired vehicle height H is attained. In this case, however, the desired vehicle height is not linearly attained, but the rise of the vehicle height after the beginning of the vehicle height adjustment is delayed by the effects of air compressibility, piping length between a pressure source and the air chamber, friction in each portion of the suspension or the like. And as pressure in the air chamber is gradually increased, the characteristic curve A draws a gentle curve and finally reaches the desired vehicle height H. Thus, when time $T_1$ (<T) elapses and the vehicle height becomes $H_1$ (<H), the adjustment of the vehicle height may be considered to be almost substantially completed.

To shorten the vehicle height adjusting time H ($H_1$), the following actions can be taken;

(a) increasing the capacity of an air compressor, i.e., the pressure source,
(b) installing a reservoir tank as the pressure source or increasing the capacity of the reservoir tank,
(c) lessening the volumn of the air chamber, and
(d) reducing the friction characteristics in each portion of the suspension or the like.

SUMMARY OF THE INVENTION

In case the capacity of the pressure source is increased or the reservoir tank is installed, associated cost and weight are increased.

In case the air chamber is lessened or friction in each portion of the suspension system is reduced, the characteristics of the suspension system are largely affected by such reduction. Therefore, the air chamber and friction cannot be varied only by the purpose of shortening the vehicle height adjusting time.

The air suspension system disclosed in the Japanese Patent Model Laid-open for Public Inspection No. 167811/82 comprises an air compressor, a reservoir tank and a solenoid valve interposed between said compressor and tank, the air compressor having an intake valve for sucking air from the reservoir tank. When an increase signal is generated from a vehicle height sensor, the solenoid valve is opened to conduct air in the reservoir tank to the air compressor. Then, compressed air is supplied from the air compressor directly to the air chamber. As a result, time taken for adjusting the vehicle height is shortened.

In this air suspension system, however, since the air compressor increases simultaneously the pressures in the air chamber and reservoir tank after the pressure in the air chamber is equalized to that in the reservoir tank, only the time taken for adjusting the vehicle height is shortened and the trend of change in the vehicle height to the adjusting time is not substantially varied to present a characteristic curve similar to that indicated by reference letter A in FIG. 1.

Now, some air suspension systems are provided with a plurality of (usually two) air chambers capable of being communicated with and shut off from each other. These suspension system vary the spring constant such that a low spring constant is provided in the communicating condition of the plurality of the air chambers and a high spring constant is provided in the shut off condition.

An object of the present invention is to shorten the vehicle height adjusting time, particularly the time required for increasing the vehicle height in consideration of the variable spring constant suspension.

A further object of the present invention is to provide a method of adjusting vehicle height which can shorten the vehicle height adjusting time without increasing substantially the associated cost and weight.

According to the present invention, there is provided a method of adjusting or controlling the height of a vehicle including a gas suspension system being capable of adjusting the vehicle height and having a plurality of gas chambers capable of communicating to and shutting off from each other, said method being characterized in that when the vehicle height is to be increased, at least one of a plurality of the gas chambers is temporarily shut off or communicated through a throttle from one or a plurality of the other gas chambers to supply pressurized gas to the other gas chambers.

Also, according to the present invention, there is provided a method of adjusting or controlling the height of a vehicle including a gas suspension system being capable of adjusting the vehicle height and having a plurality of gas chambers capable of communicated with and shut off from each other, said method being characterized in that when the vehicle height is to be increased, at least one of a plurality of the gas chambers is temporarily shut off from one or a plurality of the remaining gas chambers to supply pressurized gas to the other gas chambers, and before the vehicle height reaches a predetermined one, said other gas chambers communicate to said one gas chamber through a throttle mechanism.

According to the present invention, since a portion of a plurality of gas chambers is shut off or communicated through a throttle to supply the pressurized gas only to the gas chamber having a capacity lessened when the vehicle height is increased, a vehicle height approximating the desired one can be reached as quickly as possible to shorten substantially the essential vehicle height adjusting time.

Also, according to the present invention, modification of equipment, such as addition of the reservoir tank, expansion of the capacities of the air compressor and reservoir tank or the like, is not needed. Therefore, an increase in cost and weight can be reduced or avoided without presenting problems relating to mounting space due to enlarging the capacity.

Other objects and features of the present invention will become apparent from the following description of preferred embodiments of the invention with reference to the accompanying drawings.

DESCRIPTION OF THE PREFERRED EMBODIMENTS

The present invention concerns a method of adjusting or controlling the height of a vehicle provided with a gas suspension having a variable spring constant mechanism derived from a plurality of gas chambers and a vehicle adjusting function,, Generally, the gas suspension system is of an air suspension type and in a special case, gas other than air is used. The gas suspension system includes also a hydropneumatic suspension system.

Figure 4:
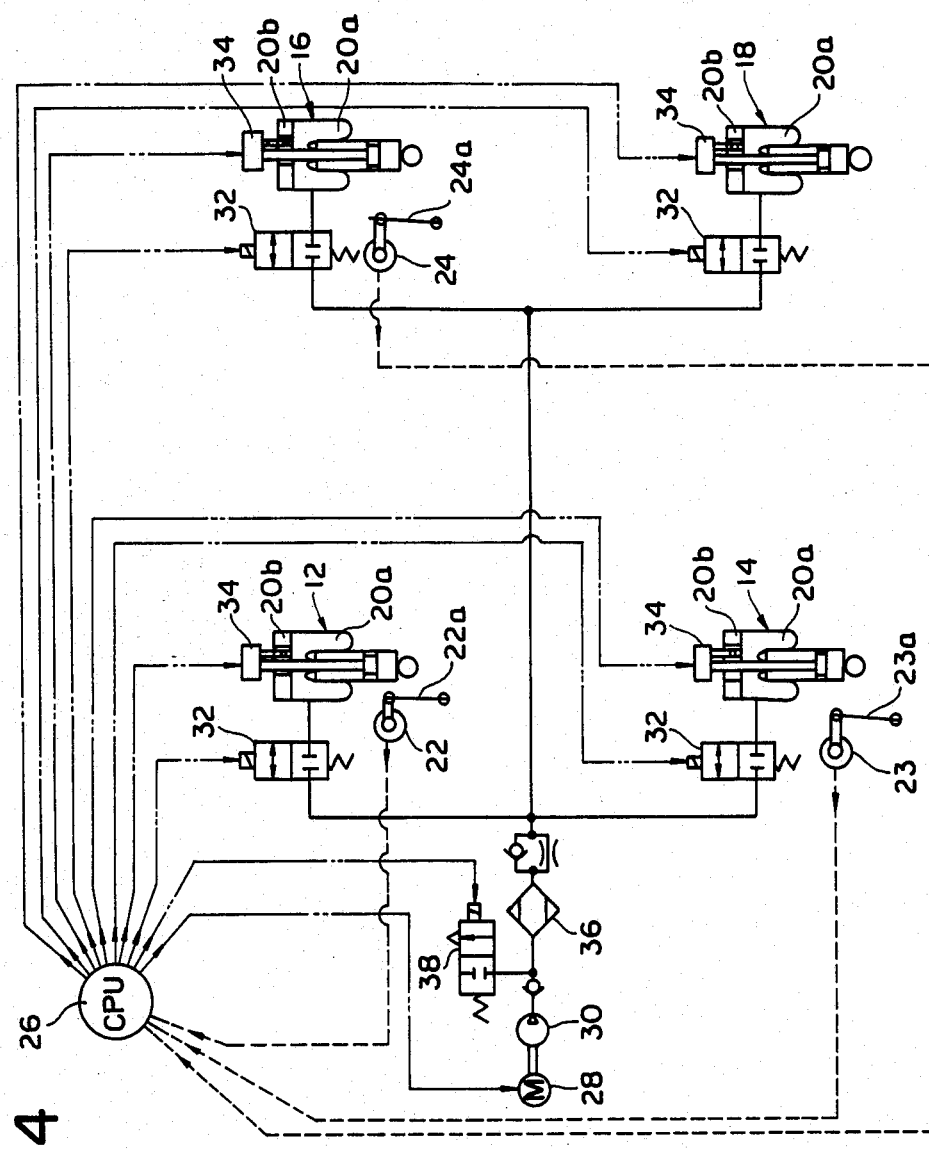
FIG. 4 is a view showing a system for executing a method according to the present invention.

In an embodiment shown in FIG. 4, four air suspension system 12, 14, 16, 18 are provided at four portions, i.e., front, rear, left and right ones of a vehicle. Each air suspension is provided with two air chambers 20a, 20b. When the two air chambers 20a, 20b communicate with each other, the capacity of the air chamber subjected to spring action is enlarged so that the low spring constant is provided. When the two air chambers are shut off from each other, only the air chamber 20a is subjected to the spring action so that the capacity of the air chamber is lessened to present a high spring constant.

Height sensors 22, 23 mounted on vehicle body portions and opposed to left and right front wheels and a height sensor 24 mounted on a vehicle body portion between left and right rear wheels detect the vehicle height from the movement of links 22a, 23a, 24a having the lower ends mounted on a suspension arm or in the proximity thereof.

When signals from the respective height sensors are sent to the input of a CPU or a computer 26 and the vehicle height is lower than a predetermined height, the computer 26 drives a motor 28 to operate an air compressor 30 on the one hand and opens a levelling valve 32 provided so as to be interlocked with the respective air suspensions on the other hand. Also, the computer 26 operates an actuator 34 of each air suspension system to shut off the two air chambers 20a, 20b temporarily. As a result, the compressed air supplied through a drier 36 is sent into the air chamber 20a to increase abruptly the pressure in the air chamber 20a. This increase of pressure increases the vehicle height in a short time.

Figure 1:
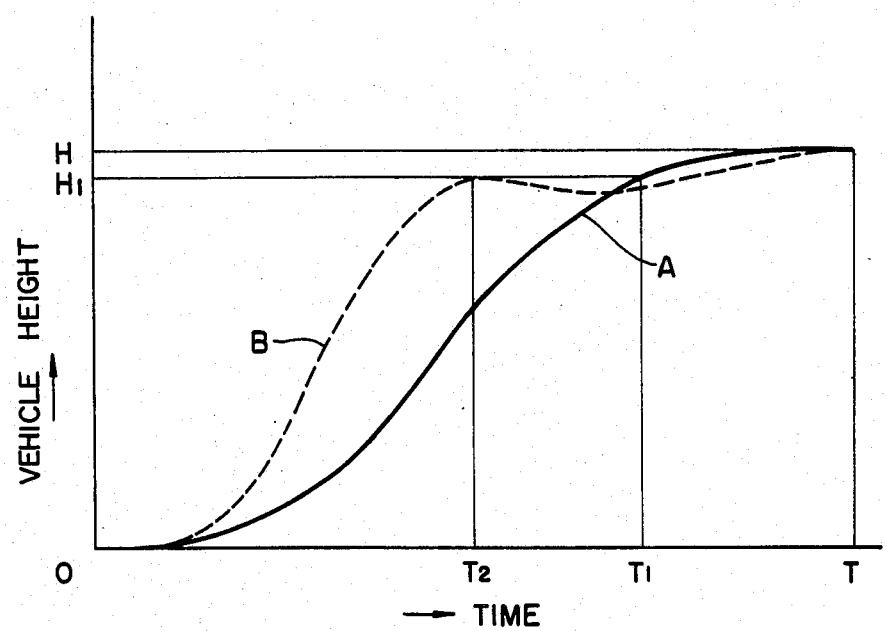
FIGS. 1 to 3 are characteristic curve views showing the corelation between adjusting time and change in the vehicle height.

As is apparent from a characteristic curve B in FIG. 1 showing the condition in which the beginning of compressed air supply and shutting-off of the air chambers 20a, 20b are carried out simultaneously at point 0 to adjust the vehicle height, it can be said that when a short time $T_2$ ($<T_1$) has elapsed, the vehicle height becomes $H_1$ meeting substantially a desired vehicle height H since the capacity of the air chamber is lessened, and $T_2$ is a substantial vehicle height adjusting time. When the respective height sensors detect the vehicle height $H_1$ or preset time $T_2$ elapses, the computer 26 operates the actuator 34 so that the two air chambers 20a, 20b communicate to each other. Since the capacity of the air chamber is then increased, pressure in the air chamber is reduced, the vehicle height is somewhat reduced and then gradually restored to provide the final desired vehicle height H and complete the adjustment of the vehicle height. At this point of time, the computer 26 stops the supply of the compressed air to the air suspension.

When the vehicle height is high in contrast with the above mentioned condition, the computer 26 opens a change-over valve 38 to purge the compressed air from the air chamber to the atmosphere.

Figure 2:
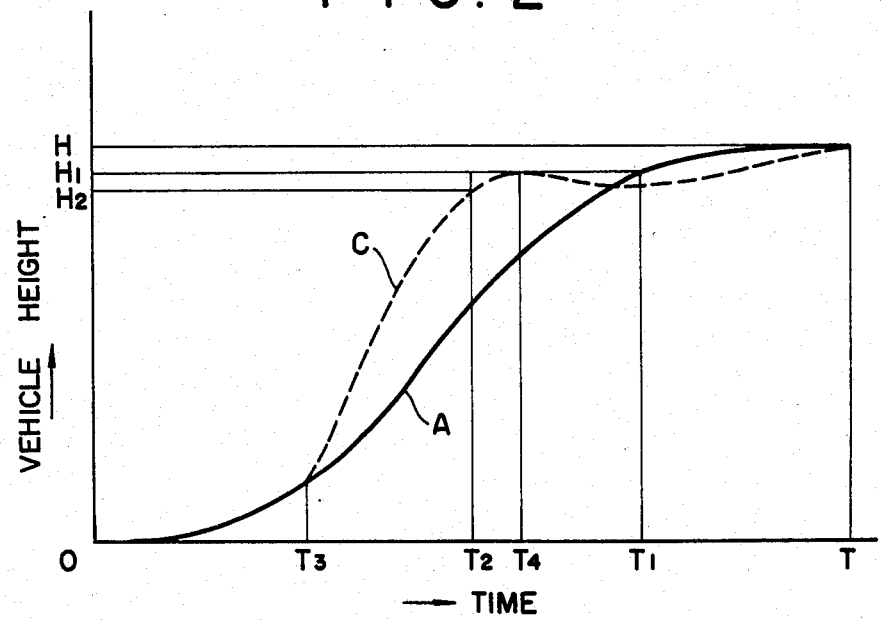

When the compressed air begins to be supplied to the air chambers 20a, 20b at point 0 and time $T_3$ ($<T_2$) has elapsed, a characteristic curve is made as shown by C in FIG. 2 by shutting off the air chambers 20a, 20b. After time $T_4$ ($<T_1$, $>T_2$) has elapsed, the vehicle height becomes $H_1$ and the adjustment of the vehicle height is substantially completed. The computer 26 operates the actuator 34 so that the two air chambers 20a, 20b communicate with each other.

Since the characteristic curve C rises abruptly, the difference between the vehicle height $H_2$ and the desired one H is small even if the vehicle height $H_2$ in the time $T_2$ is deemed to be the substantial adjusting height. That is, even if the shutting-off of the two air chambers 20a, 20b is delayed from the beginning 0 of the supply of the compressed air, it can be said that the substantial vehicle height adjusting time is not varied. It is natural that the two air chambers 20a, 20b can be shut off before the beginning 0 of the supply of the compressed air.

In an aforementioned embodiment, the two air chambers 20a, 20b are temporarily shut off, when the vehicle height is to be increased. In a modification of the embodiment, the two air chambers 20a, 20b may be temporarily communicated through a throttle mechanism.

Figure 3:
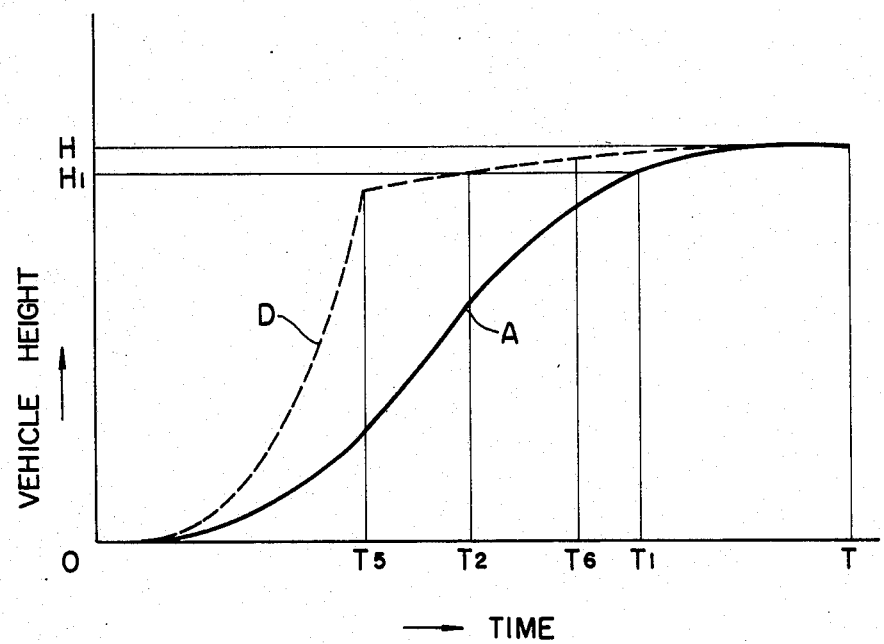
Figure 5:
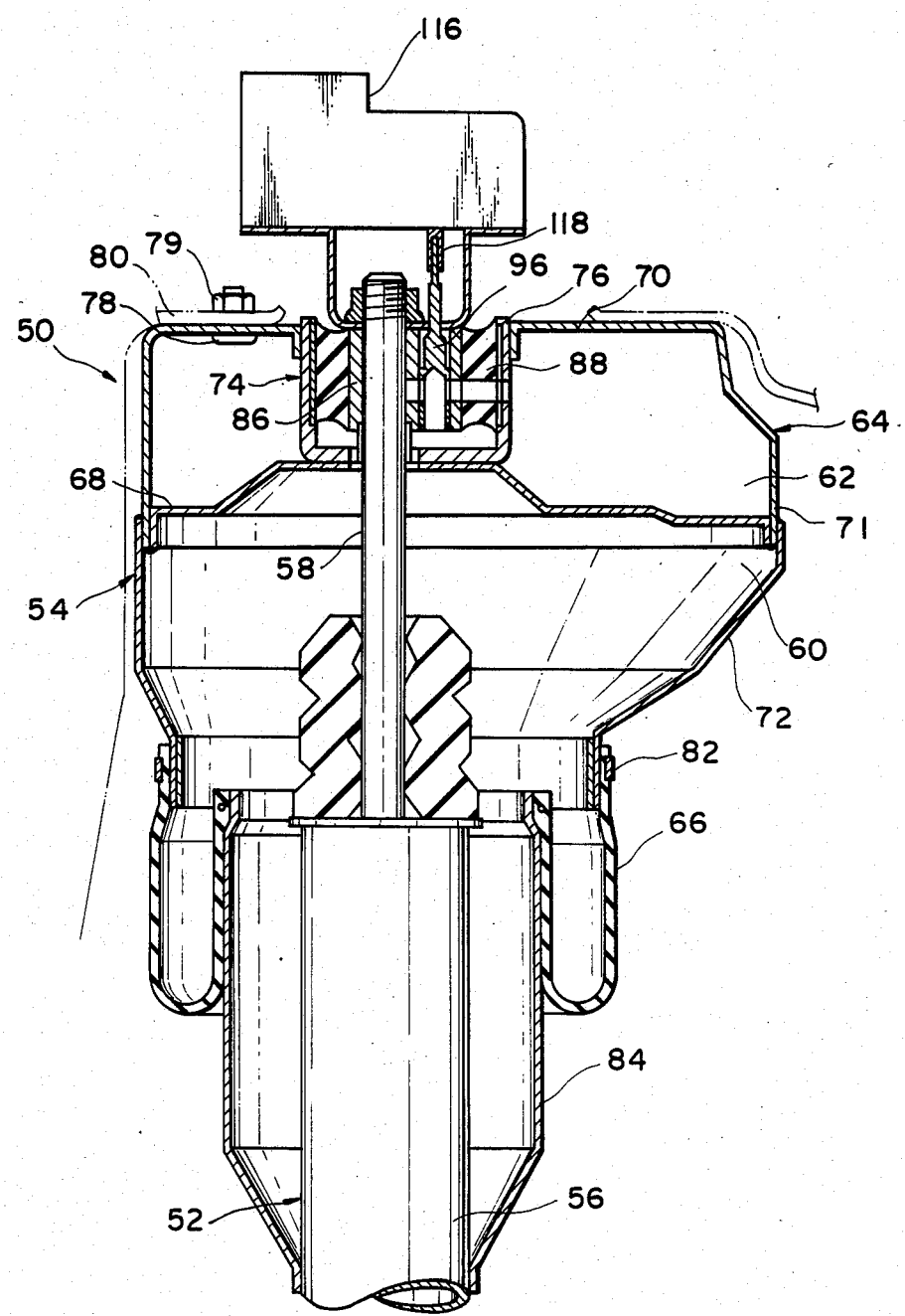
FIG. 5 is a sectional view of an air suspension system.
Figure 6:
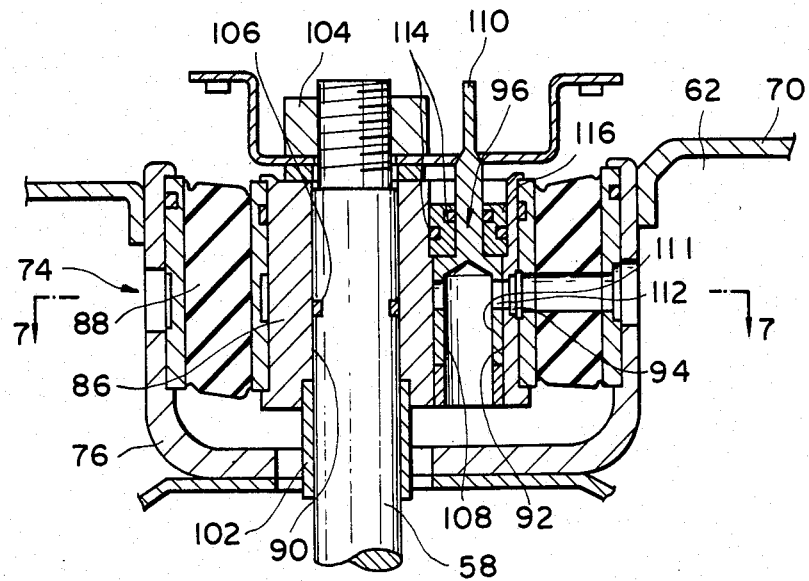
FIG. 6 is an enlarged sectional view of principal parts of the air suspension system.
Figure 7:
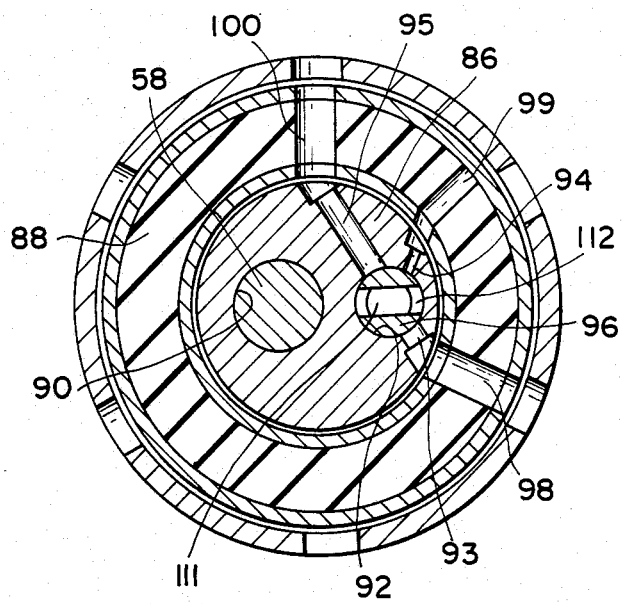
FIG. 7 is a sectional view taken along line 7—7 in FIG. 6.

A characteristic curve D shown in FIG. 3 shows an embodiment in which some reduction of the vehicle height produced when the two air chambers 20a, 20b communicate with each other can be avoided. The two air chambers 20a, 20b are shut off at the beginning 0 of the supply of the compressed air and after time $T_5$ ($<T_2$) has elapsed when the vehicle height reaches approximately a predetermined one $H_1$ in this embodiment, the air chamber 20a is adapted to communicate gradually to the air chamber 20b through a throttle. As a result, the vehicle height adjusting speed is represented by a somewhat gentle curve. After time $T_6$ ($<T_1$, $>T_2$) has elapsed, the two air chambers 20a, 20b are communicated completely with each other, so that the vehicle height provides the final desired vehicle height H without any reduction (or with slight reduction) under the influence of hysteresis of the suspension or the like. In this case, the vehicle height provides the desired height H while drawing a gentle curve by enlarging the throttle process in a stepless manner. Said method of adjusting the vehicle height can be carried out by mounting the air suspension system as shown in FIGS. 5 to 7 on the vehicle.

An air suspension system 50 is provided with an air spring 54 formed to surround the upper end of a shock absorber 52.

The shock absorber 52, which is known per se, is provided with a cylinder 56 and a piston rod 58 connected to a piston (not shown) slidably disposed in said cylinder 56 and projecting from the cylinder 56 to the outside. For the shock absorber 52 are used so-called mono-tube type shock absorber of only a single cylinder other than one of a so-called twin-tube type one provided with inside and outside cylinders.

The air spring 54 comprises a main air chamber 60 and an auxiliary air chamber 62 filled with compressed air. The main air chamber 60 is formed by cooperation of a housing 64 and a diaphragm 66. On the other hand, the auxiliary air chamber 62 is formed by cooperation of the housing 64 and a partition plate 68.

A ceiling portion 70 of the housing 64 is welded over the whole periphery of the inner edge to a support member 76 of a support 74. A tubular portion 71 extends downwards from the ceiling portion 70 integrally therewith. A plurality of bolts 78 (one of them is shown in FIG. 5) are welded in the air tight manner on the ceiling portion 70 of the housing 64. Each bolt 78 extends through a vehicle body 80 and a nut 79 is screwed onto the bolt 78 to connect the housing 64 to the vehicle body. The partition plate 68 is welded on the outer peripheral edge to the tubular portion 71 of the housing 64. Then, the plate 68 is welded on the inner peripheral edge to the support member 76 to form the auxiliary air chamber 62.

A tubular portion 72 of the housing 64 is fitted in the tubular portion 71 and welded over the whole periphery thereto. The diaphragm 66 is formed of rubber cylindrically folded back at the gentral portion. An outside end of the diaphragm is sandwiched between the tubular portion 72 of the housing 64 and a ring 82 and fixed by caulking the ring 82. An inside end of the diaphragm 66 is fitted onto a cylindrical air piston 84 welded to the cylinder 56 to form the main air chamber 60.

The support 74 is provided with a rigid member 86, a bushing 88 formed of rubber and said support member 76. The rigid member 86 is formed of high rigidity material like iron having a circular section. As shown in FIGS. 6 and 7, the rigid member 86 has a hole 90 through which the piston rod 58 extends, a hole 92 in which a valve body 96 is disposed and three holes 93, 94, 95 opened radially from the hole 92. The bores of the holes 93, 95 are equal to each other and larger than that of the hole 94.

The bushing 88 is interposed between the rigid member 86 and the support member 76 and has holes 98, 99, 100 formed therein. These holes communicate respectively with the holes 93, 94, 95 in the rigid member 86, extend radially and open to the auxiliary air chamber 62 through the corresponding holes in the support member 76. The main and auxiliary air chambers 60, 62 communicate with to each other through the holes 92 to 95 in the rigid member 86, the holes 98 to 100 in the bushing 88 and the holes in the support member 76.

The piston rod 58 is adapted to extend through the hole 90 in the rigid member. A ring 102 bears against the rigid member 86. A nut 94 is screwed onto the piston rod 58 to fix it to the rigid member 86 in an air tight manner with an O-ring 106.

The valve body 96 is provided integrally with a slide portion 108 and a flat portion 110 extending upward through a reduced diameter portion. The slide portion 108 is provided with a hole 111 opened axially and a hole 112 opened diametrically. When this hole 112 is in the position shown in FIG. 7, it does not communicate to any of three holes 93 to 95 in the rigid member 86. Thus, under such condition, the main air chamber 60 is shut off from the auxiliary air chamber 62. When the valve body 96 is rotated 60° clockwise from the position shown in FIG. 7, the hole 112 communicates with the holes 93, 95 in the rigid member 86 so that the main and auxiliary air chambers 60, 62 communicate completely with each other. When the valve body 96 is rotated further 60° clockwise, the hole 112 communicates to the hole 94 in the rigid member 86 so that the main and auxiliary air chambers 60, 62 communicate with each other through a throttle.

The valve body 96 is inserted into the hole 92 in the rigid member 86. A collar 116 having O-rings 114 for seal interposed is forced into the hole 92. Therefore, the valve body 96 is disposed rotatably in the hole 92 in an air tight manner.

An actuator 116 comprises a drive machine and a gear train which are known per se, and has an output shaft 118 into which is inserted the flat portion 110 of the valve body 96. Therefore, the valve body 96 is rotated. Obviously, numerous modifications and variations of the present invention are possible in light of the above teachings. It is therefore to be understood that witin the scope of the appended claims, the invention may be practiced otherwise than as specifically described herein.

What is claimed is:

1. A method of adjusting the height of a vehicle which includes a gas suspension system for adjusting the vehicle height and having a plurality of gas chambers for being communicated with and shut off from each other, comprising the steps of:
   temporarily communicating through a throttle at least one gas chamber to at least one remaining gas chamber; and
   supplying pressurized gas to the at least one remaining gas chamber so as to increase the height of the vehicle.

2. A method of adjusting the height of a vehicle which includes a gas suspension for adjusting the vehicle height and having a plurality of gas chambers for being communicated with and shut from each other, comprising the steps of:
   shutting off temporarily at least one gas chamber from one or more remaining gas chambers;
   supplying pressurized gas to the one or more remaining gas chambers; and
   affording communication between said one gas chamber and the one or more remaining gas chambers through a throttle before the vehicle reaches a predetermined height so as to increase the height of said vehicle.

3. A method of adjusting a vehicle height as claimed in claim 2, wherein said throttling is carried out in a plurality of steps.

4. A method of adjusting a vehicle height as claimed in claim 2, wherein said throttling is carried out by a single step.

5. A method of adjusting the height of a vehicle which includes an air suspension for adjusting the vehicle height and having first and second air chambers being being communicated with and shut off from each other, comprising the steps of:
   shutting-off temporarily said first air chamber from the second air chamber;
   supplying the compressed air to the second air chamber not later than the shutting-off of the first air chamber; and
   affording communication between said second air chamber and said first air chamber through a throttle before the vehicle reaches a predetermined height so as to increase the height of said vehicle.

* * * * *